United States Patent
Doran

(10) Patent No.: US 9,518,662 B2
(45) Date of Patent: Dec. 13, 2016

(54) CONTROL VALVE TRIM CAGE HAVING A PLURALITY OF ANTI-CAVITATION OR NOISE ABATEMENT BARS

(71) Applicant: FISHER CONTROLS INTERNATIONAL LLC, Marshalltown, IA (US)

(72) Inventor: Aaron C. Doran, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 188 days.

(21) Appl. No.: 13/895,789

(22) Filed: May 16, 2013

(65) Prior Publication Data

US 2014/0339454 A1 Nov. 20, 2014

(51) Int. Cl.
  *F16K 47/08* (2006.01)
  *F16K 47/04* (2006.01)
  *F16K 1/32* (2006.01)

(52) U.S. Cl.
  CPC .............. *F16K 1/32* (2013.01); *F16K 47/08* (2013.01); *F16K 47/04* (2013.01)

(58) Field of Classification Search
  CPC ................................ F16K 47/08; F16K 47/04
  USPC ............ 137/625.28, 625.35, 625.38, 625.33
  See application file for complete search history.

(56) References Cited

U.S. PATENT DOCUMENTS

| 1,342,955 | A | * | 6/1920 | Gebhardt | F16K 47/04 |
| | | | | | 251/333 |
| 2,130,614 | A | * | 9/1938 | Collins et al. | 137/244 |
| 3,392,754 | A | * | 7/1968 | Risk | 137/637 |
| 3,776,278 | A | * | 12/1973 | Allen | 137/625.38 |
| 3,791,413 | A | * | 2/1974 | Muller | F16K 47/04 |
| | | | | | 137/625.3 |
| 4,279,274 | A | * | 7/1981 | Seger | 138/42 |
| 6,382,253 | B1 | * | 5/2002 | McCarty et al. | 137/625.33 |
| 6,394,134 | B1 | * | 5/2002 | Kwon | 137/625.3 |
| 7,152,628 | B2 | * | 12/2006 | Folk et al. | 137/625.33 |
| 2010/0300554 | A1 | * | 12/2010 | Howes | F16K 3/0254 |
| | | | | | 137/511 |

FOREIGN PATENT DOCUMENTS

DE   102010054123 A1   6/2012
EP      0039995 A1   11/1981
GB       278451 A   10/1927

OTHER PUBLICATIONS

Search Report for PCT/US2014/038366, mailed Aug. 21, 2014.
Written Opinion for PCT/US2014/038366, mailed Aug. 21, 2014.
International Preliminary Report on Patentability for International application No. PCT/US2014/038366, dated Nov. 17, 2015.

* cited by examiner

*Primary Examiner* — Michael R Reid
*Assistant Examiner* — Christopher Ballman
(74) *Attorney, Agent, or Firm* — Marshall, Gerstein & Borun LLP

(57) ABSTRACT

A cage for a control valve trim assembly includes a cage wall, a first plate attached to the cage wall, a second plate spaced apart from the cage wall, and a first plurality of rods longitudinally disposed between the first plate and the second plate. Fluid flowing through the cage is characterized by the first plurality of rods.

17 Claims, 8 Drawing Sheets

US 9,518,662 B2

CONTROL VALVE TRIM CAGE HAVING A PLURALITY OF ANTI-CAVITATION OR NOISE ABATEMENT BARS

BACKGROUND

Field of the Disclosure

The invention generally relates to control valve trim assembly cages and more specifically to control valve trim assembly cages having a plurality of anti-cavitation or noise abatement bars.

Related Technology

Fluid valves control the flow of fluid from one location to another. When the fluid valve is in a closed position, high pressure fluid on one side is prevented from flowing to a lower pressure location on the other side of the valve. Often fluid valves contain a movable fluid control member and a seat of some sort that cooperates with the fluid control member to control fluid flow through the valve. Generally speaking the control elements (including the fluid control member, the seat, and a cage if one exists) are known as "valve trim" or "trim assembly" in the art. In some cases it may be desirable to characterize fluid as it flows through the valve, for example, to reduce noise. In these cases, a trim assembly may be used that includes a cage with a plurality of openings that are drilled through a wall of the cage. The openings may be sized and shaped to characterize fluid flow as the fluid flows through the openings in the cage. In some cases up to 90,000 or more openings are drilled in the cage wall, which results in a very time consuming and expensive manufacturing process for known cages.

SUMMARY OF THE DISCLOSURE

In accordance with a first exemplary aspect, a cage for a control valve trim assembly includes a cage wall, a first plate attached to the cage wall, a second plate spaced apart from the cage wall, and a plurality of rods longitudinally disposed between the first plate and the second plate. Fluid flowing through the cage is characterized by the plurality of rods.

In accordance with a second exemplary aspect, a control valve includes a valve body having a fluid inlet and a fluid outlet connected by a fluid passageway. A valve seat is disposed within the fluid passageway. A cage is disposed within the fluid passageway, the cage including a cage wall, a first plate connected to the cage wall and a second plate spaced apart from the cage wall, and a first plurality of rods longitudinally disposed between the first plate and the second plate. A fluid control member is movably disposed within the cage, the fluid control member cooperates with the valve seat and the cage to control and characterize fluid flow through the fluid passageway.

In further accordance with any one or more of the foregoing first and second aspects, a cage or control valve may further include any one or more of the following preferred forms.

In some preferred forms, the cage may include a second plurality of rods longitudinally disposed between the first plate and the second plate. The first plurality of rods may be arranged to form a first circle when the cage is viewed in lateral cross-section. The first circle may have a first radius. The second plurality of rods may be arranged to form a second circle when the cage is viewed in lateral cross-section. The second circle may have a second radius. The first radius may be greater than the second radius. The rods in the first plurality of rods may be separated from one another about a circumference of the first circle by a distance of between 1 and 5 times the diameter of an individual rod. The rods in the second plurality of rods may be arranged circumferentially around the second circle to be offset from the rods in the first plurality of rods. The cage may include a third plate disposed between the first plate and the second plate and the third plate may be located at between 10% and 30% of the distance from the second plate to the first plate. The rods in the first plurality of rods may be spaced differently between the second plate and the third plate than between the first plate and the third plate. The cage may include a fourth plate disposed between the first plate and the second plate.

DETAILED DESCRIPTION

A trim assembly cage constructed in accordance with the disclosure advantageously has increased efficiency over known cages due to longitudinally oriented anti-cavitation rods or noise abatement rods that stage pressure drops as fluid flows across the rods. These anti-cavitation rods and/or noise abatement rods, and the plates that hold the bars, are easier to manufacture than known cages that include a plurality of bores. Moreover, the trim assembly cage is easily reparable when damaged where known cages are generally not repairable or are very difficult to repair if damaged.

Figure 1:
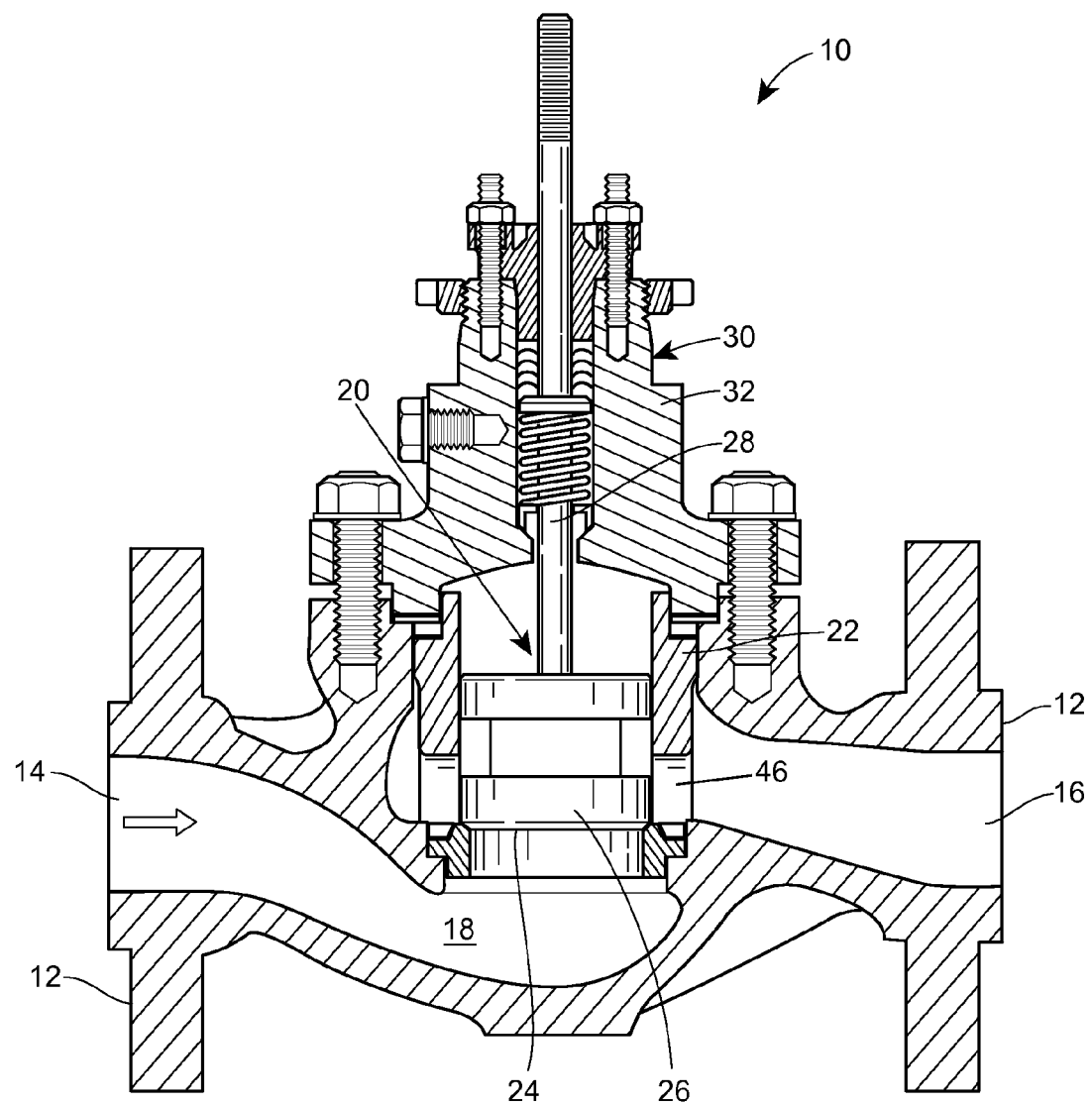
FIG. 1 is a cross-sectional view of a control valve having a trim assembly including a cage constructed in accordance with the teachings of the disclosure.

Turning now to FIG. 1, a control valve 10 includes a valve body 12 having a fluid inlet 14 and a fluid outlet 16 connected by a fluid passageway 18. A trim assembly 20 is disposed within the valve body 12 between the fluid inlet 14 and the fluid outlet 16. The trim assembly 20 includes a cage 22, a seat 24, and a fluid control member, such as a plug 26, that is disposed within the cage 22. The plug 26 interacts with the seat 24 and the cage 22 to control fluid flow through the valve body 12. A stem 28 is connected to the plug 26 at one end and to an actuator 30 at another end. The actuator 30 controls movement of the plug 26 within the cage 22. In the embodiment of FIG. 1, the actuator 30 is secured to the valve body 12 by a bonnet 32. In other embodiments, the actuator 30 may be secured within the valve body 12 itself, or the actuator 30 may be secured to the valve body 12 by a yoke (not shown).

Figure 2:
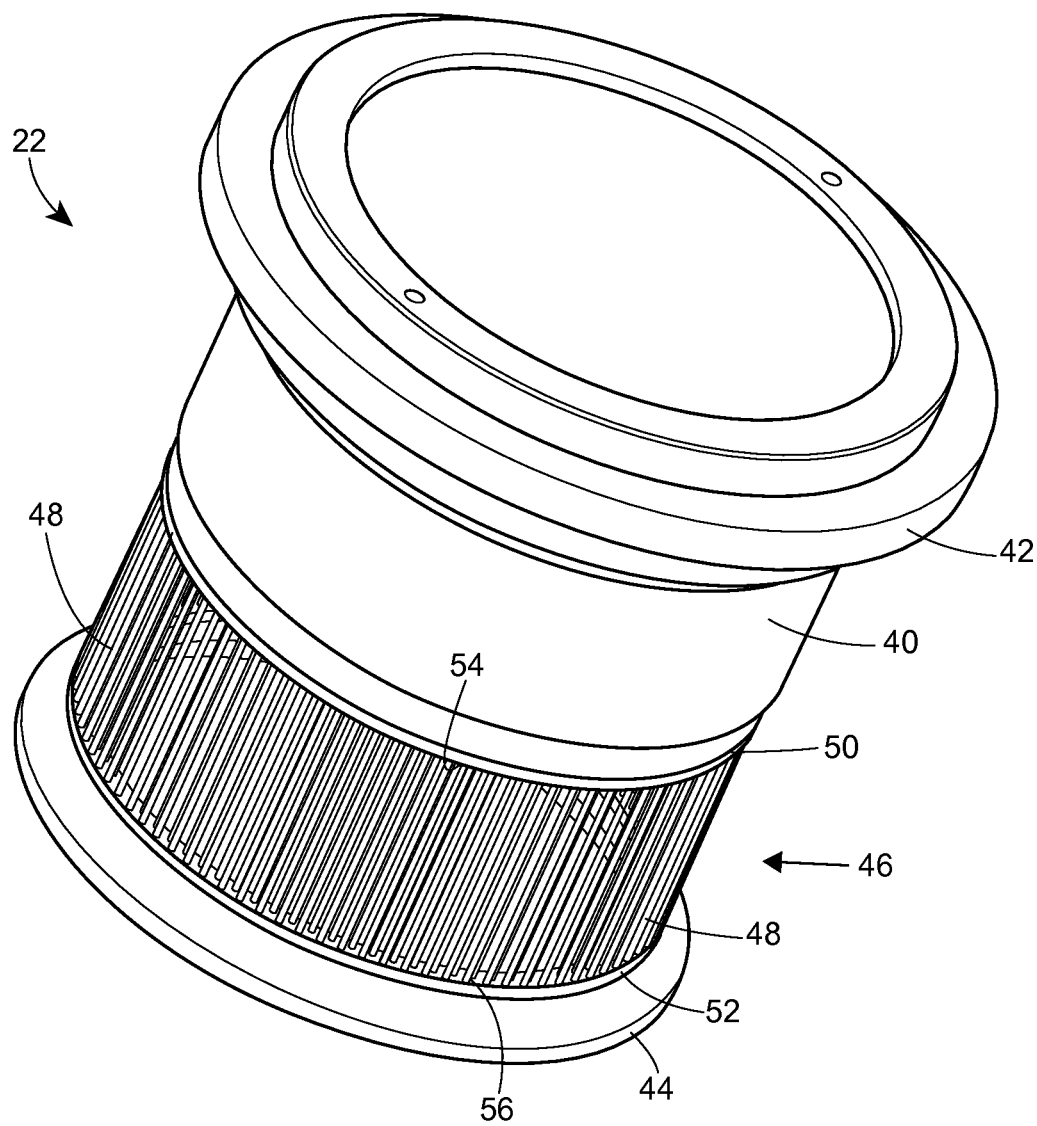
FIG. 2 is a close-up perspective view of the cage of FIG. 1.
Figure 3:
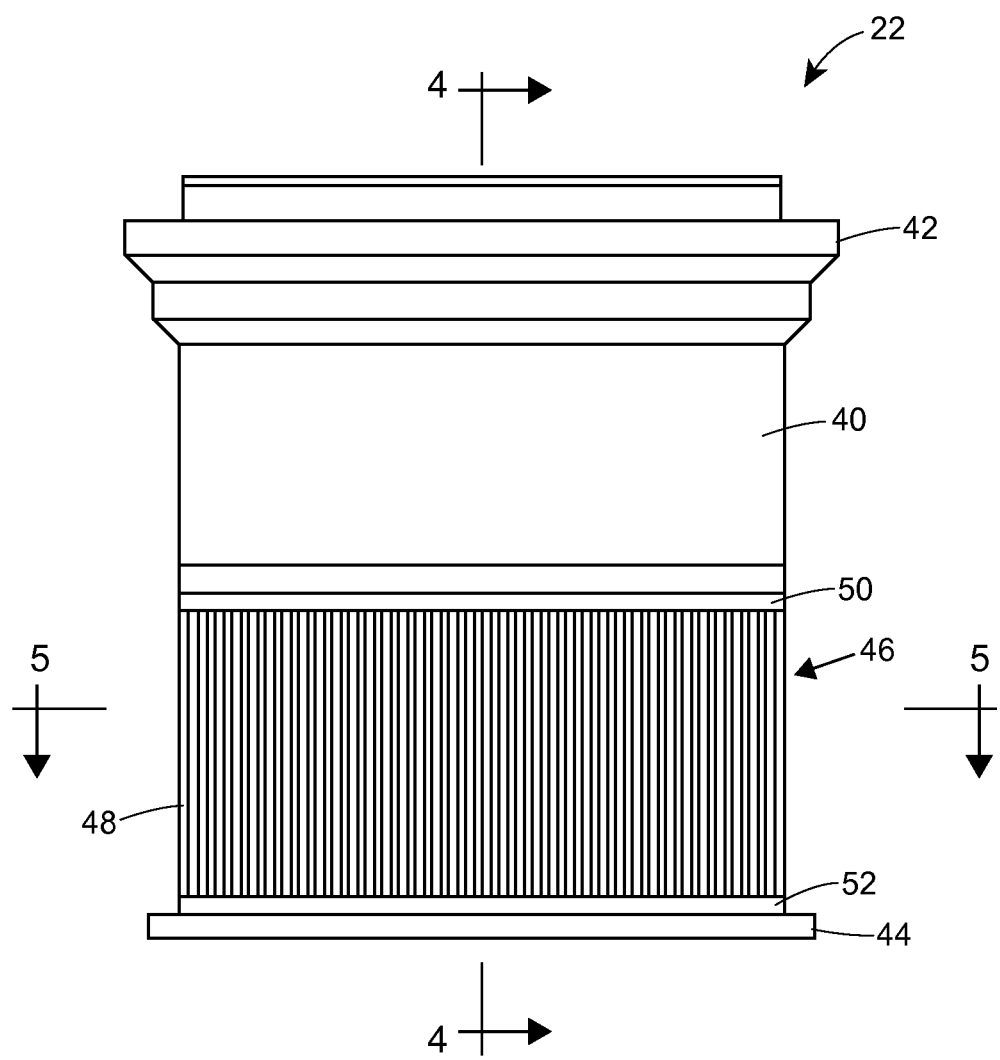
FIG. 3 is a front plan view of the cage of FIG. 1.

A close up perspective view of the cage 22 is illustrated in FIG. 2 and a plan view of the cage 22 is illustrated in FIG. 3. The cage 22 includes a generally cylindrical cage wall 40 that is connected to a first or upper mounting flange 42, which extends radially outward away from the cage wall 40. The first mounting flange 42 may be secured between the bonnet 32 and the valve body 12 when the cage 22 is mounted in the valve body 12. A second or lower mounting flange 44 is separated from the cage wall 40 by a window or opening 46, the second mounting flange 44 also extends radially outward.

Returning briefly to FIG. 1, as the plug 26 reciprocates within the cage 22, the plug 26 covers or uncovers portions of the window 46. When portions of the window 46 are uncovered, fluid flows through the window 46 from the fluid inlet 14 to the fluid outlet 16. By placing obstructions in the window, the fluid flow may be selectively characterized to achieve certain desirable flow characteristics, such as low cavitation, low noise, or high pressure drops.

Returning to FIGS. 2 and 3, in order to characterize fluid flow through the window 46, the cage 22 includes a plurality of longitudinal rods 48 that extend from a first plate 50, which is connected to the cage wall 40, to a second plate 52, which is connected to the second mounting flange 44, as illustrated in FIG. 2. In some embodiments, the first plate 50 may be integrally formed with the cage wall 40 and/or the second plate 52 may be integrally formed with the second mounting flange 44. In other embodiments, the first plate 50 may be formed separately from the cage wall 40 and operatively connected to the cage wall 40 during assembly of the cage 22. Similarly, in other embodiments, the second plate 52 may be formed separately from the second mounting flange 44 and operatively connected to the second mounting flange 44 during assembly of the cage 22.

For ease of manufacturing, the embodiment illustrated in FIG. 2 may include a first plurality of openings 54 located in the first plate 50 and a second plurality of openings 56 located in the second plate 52. Each individual rod 48 may have one end disposed in one of the first plurality of openings 54 and another end disposed in one of the second plurality of openings 56. In this way, the cage 22 may be rapidly assembled as sub-assemblies, for example as a first sub assembly including the first plate 50, the second plate 52, and the rods 48, and as a second sub-assembly including the cage wall 40 and the first mounting flange 42.

Figure 4:
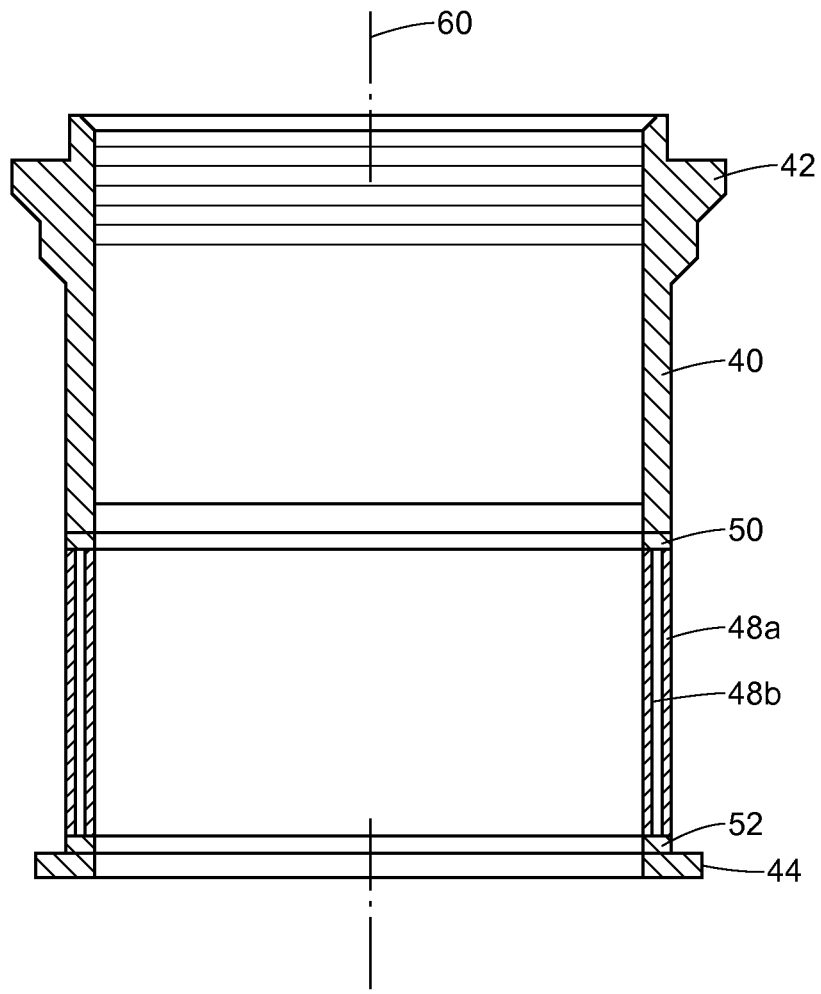
FIG. 4 is a longitudinal cross-sectional view of the cage of FIG. 1.

As illustrated in FIG. 4, the plurality of rods 48 may include a first or outer plurality of rods 48a and a second or inner plurality of rods 48b. The second plurality of rods 48b may be offset relative to the first plurality of rods 48a so that each of the second plurality of rods 48b is located radially inward and circumferentially between two of the first plurality of rods 48. In this way, fluid flowing through the first and second plurality of rods 48a, 48b must change direction to go around the rods, which slows the flow and reduces cavitation and noise.

Figure 5:
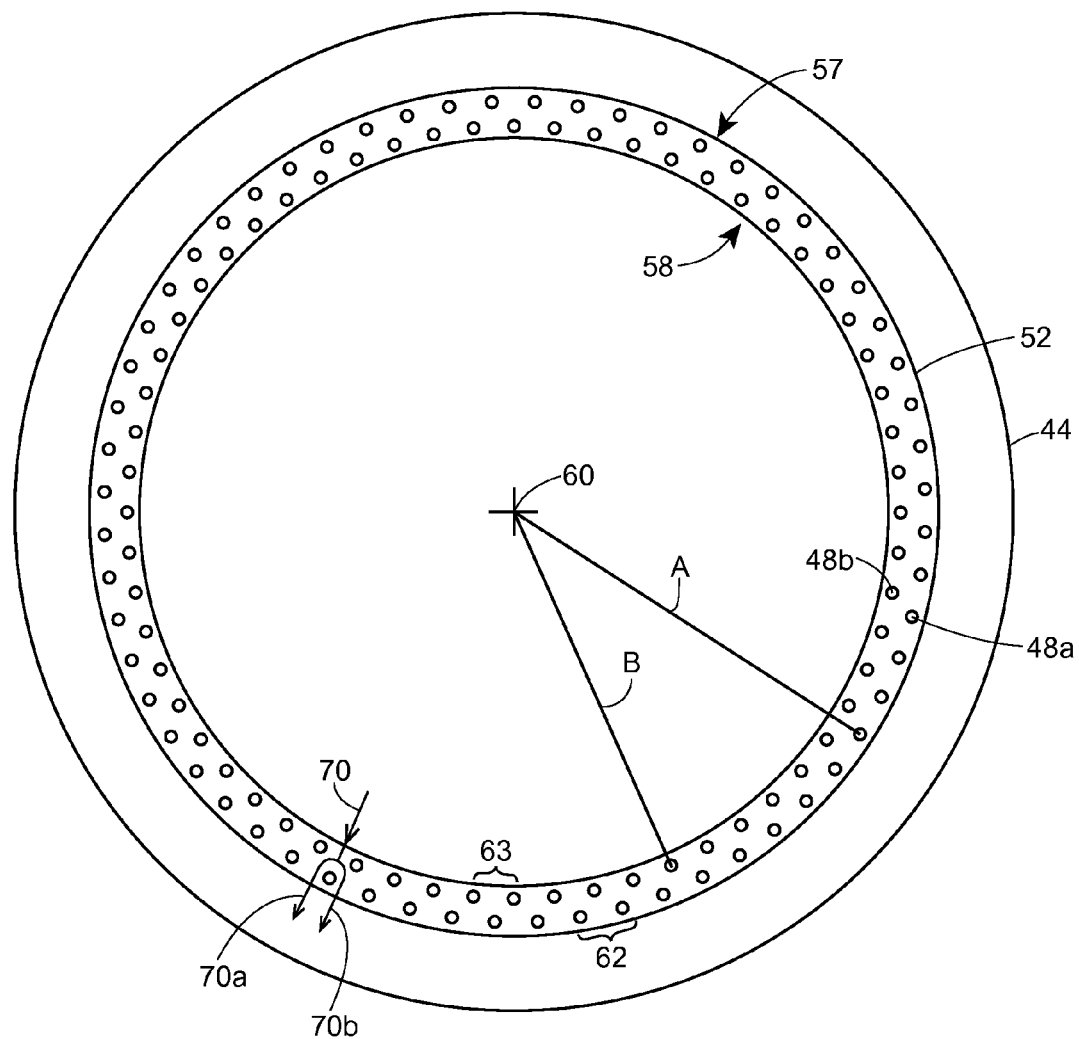
FIG. 5 is a lateral cross-sectional view of the cage of FIG. 1.

As illustrated in FIG. 5, the first plurality of rods 48a is arranged so that the individual rods form a first circle 57 that is concentric with a longitudinal axis 60 of the cage 22. The first circle 57 formed by the first plurality of rods 48a has a radius A. Similarly, the second plurality of rods 48b is arranged so that the individual rods form a second circle 58 that is concentric with the longitudinal axis 60 of the cage 22. However, the second circle 58 has a radius B that is smaller than radius A of the first circle 57.

Each of the rods in the first plurality of rods 48a is spaced from another rod in the first plurality of rods 48a by a first space 62. First space 62 is preferably between 1 and 5 times the diameter of an individual rod, more preferably between 1 and 3 times the diameter of an individual rod, and even more preferably between 1.5 and 2.5 times the diameter of an individual rod. While the rods 48 are illustrated as having a circular cross-sectional shape, other cross-sectional shapes, such as oval, triangular, square, rectangular, pentagonal, hexagonal, polygonal, or irregular cross-sectional shapes may be used to achieve particular characterization of fluid flow for a given situation. When a cross-sectional shape other than circular is employed, the above referenced diameters may correspond to a maximum thickness of the rod.

In a similar fashion, each of the rods in the second plurality of rods 48b is spaced from another rod in the second plurality of rods 48b by a second space 63. The second space 63 is preferably between $\frac{1}{32}$ and 10 times the diameter of an individual rod, more preferably between $\frac{1}{4}$ and 3 times the diameter of an individual rod. In one embodiment the rods may have a radius of about $\frac{1}{8}$ in. In other embodiments, the rods may have a radius of between $\frac{1}{1000}$ and $\frac{1}{10}$ of the radius A of the first circle so that between 10 and 1000 rods may make up each of the first and second pluralities of rods 48a, 48b.

The second plurality of rods 48b is arranged so that each rod in the second plurality of rods 48b is located circumferentially in the first space 62 between individual rods in the first plurality of rods 48a and the second plurality 48b of rods is located radially inward of the first plurality of rods 48a. In other words, the first plurality of rods 48a and the second plurality of rods 48b are circumferentially offset from one another so that fluid flowing (shown by arrow 70) from inside the cage 22 through the window 46 must flow between the rods in the second plurality of rods 48b and then break apart so to flow around the rods in the first plurality of rods 48a (shown by arrows 70a and 70b). In this way, fluid flowing through the window 46 and between the rods in the first and second plurality of rods 48a, 48b is slowed, which causes a pressure drop and reduces cavitation and noise.

In yet other embodiments, one, three, four, or more pluralities of rods that are oriented in radially smaller or larger circles may be included to characterize fluid flow through the cage 22. In this manner, the fluid flowing through the cage 22 may flow through multiple pressure reduction stages.

Figure 6:
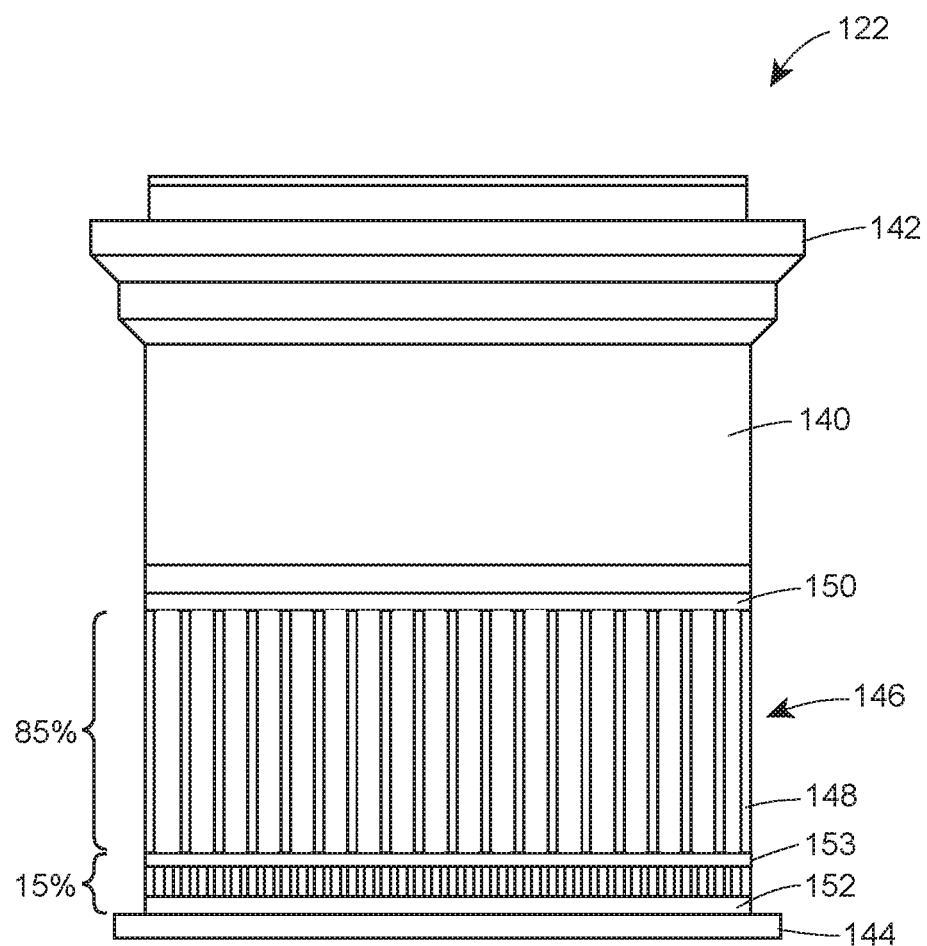
FIG. 6 is a front plan view of an alternate embodiment of the cage of FIG. 1.

Turning now to FIG. 6, an alternate embodiment of a cage 122 is illustrated. Features of the cage 122 that correspond to features of the cage 22 of FIGS. 2-5 have reference numerals that are 100 greater than the numerals in FIGS. 2-5. The cage 122 includes a cage wall 140, attached to a first mounting flange 142 and a first plate 150. A second mounting flange 144 is attached to a second plate 152. Space between the first plate 150 and the second plate 152 forms a window 146. A plurality or rods 148 extend from the first plate 150 to the second plate 152. The embodiment of the cage 122 in FIG. 6 further includes a third plate 153 disposed between the first plate 150 and the second plate 152. The third plate 153 may structurally reinforce the rods 148 to keep the rods 148 from bending, which results in a more rigid structure. In one embodiment, the third plate 153 may be placed between 10% and 30% of the total travel distance of the valve plug 26, preferably between 10% and 20% of the total travel distance of the valve plug 26 and more preferably about 15% of the total travel distance of the valve plug 26. In this case the total travel distance of the valve plug 26 may be approximately equal to the distance between the first plate 150 and the second plate 152. Thus, the third plate 153 may be placed approximately 15% of the distance from the second plate 152 to the first plate 150. By placing the third plate within the above recited ranges, the fluid flow through the cage 122 may be further characterized and a more linear characteristic curve may be imparted to the flow.

Additionally, when a third plate 153 is installed, the spacing of the bars 148 above the third plate 153 and below the third plate 153 may differ to achieve different flow characterization for different regions of valve plug 26 travel. For example, the bars 148 above the third plate 153 may have a greater spacing to allow more fluid flow because downstream devices are requiring more fluid flow when the valve plug 26 is more open. The opposite may also be true and the bar spacing may be tailored for different operations or requirements.

In yet other embodiments, four, five, or more plates may be included, each plate being located between the first plate 150 and the second plate 152. By adding plates and/or changing spacing of the bars, the cage may be designed to characterize the flow differently for different opening stages of the valve plug. In this way, the cage may impart desirable flow characteristics based upon downstream demand. For example, during low downstream demand, the bars may be spaced tightly together to maximize noise reduction. Alternatively, during high downstream demand, the bars may be spaced farther apart, thus sacrificing noise reduction for increased fluid flow.

Figure 7:
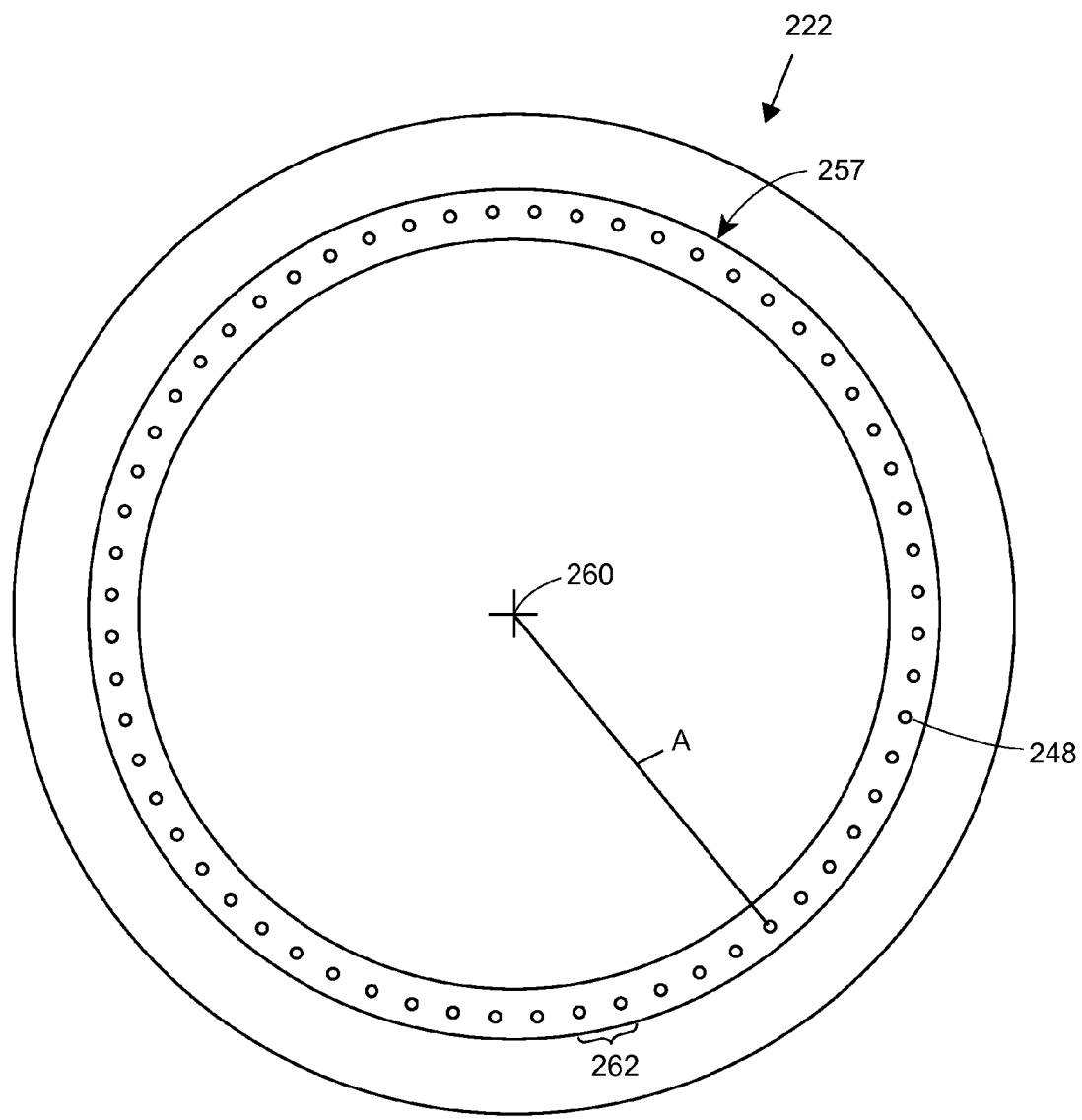
FIG. 7 is a lateral cross-sectional view of an alternate embodiment of a cage.

As discussed above, in yet other embodiments, one, three, four, or more pluralities of rods that are oriented in radially smaller or larger circles may be included to characterize fluid flow through the cage 22. FIG. 7 illustrates an alternate embodiment of a cage 222 having a single plurality of rods 248. The single plurality of rods 248 is arranged so that the individual rods form a first circle 257 that is concentric with a longitudinal axis 260 of the cage 222. The first circle 257 formed by the single plurality of rods 248 has a radius A.

Each of the rods in the single plurality of rods 248 is spaced from another rod in the first plurality of rods 248 by a first space 262. First space 262 is preferably between 1 and 5 times the diameter of an individual rod, more preferably between 1 and 3 times the diameter of an individual rod, and even more preferably between 1.5 and 2.5 times the diameter of an individual rod. While the rods 248 are illustrated as having a circular cross-sectional shape, other cross-sectional shapes, such as oval, triangular, square, rectangular, pentagonal, hexagonal, polygonal, or irregular cross-sectional shapes may be used to achieve particular characterization of fluid flow for a given situation. When a cross-sectional shape other than circular is employed, the above referenced diameters may correspond to a maximum thickness of the rod. The rods may have a radius of between $1/1000$ and $1/10$ of the radius A of the first circle so that between 10 and 1000 rods may make up the single plurality of rods 248.

Figure 8:
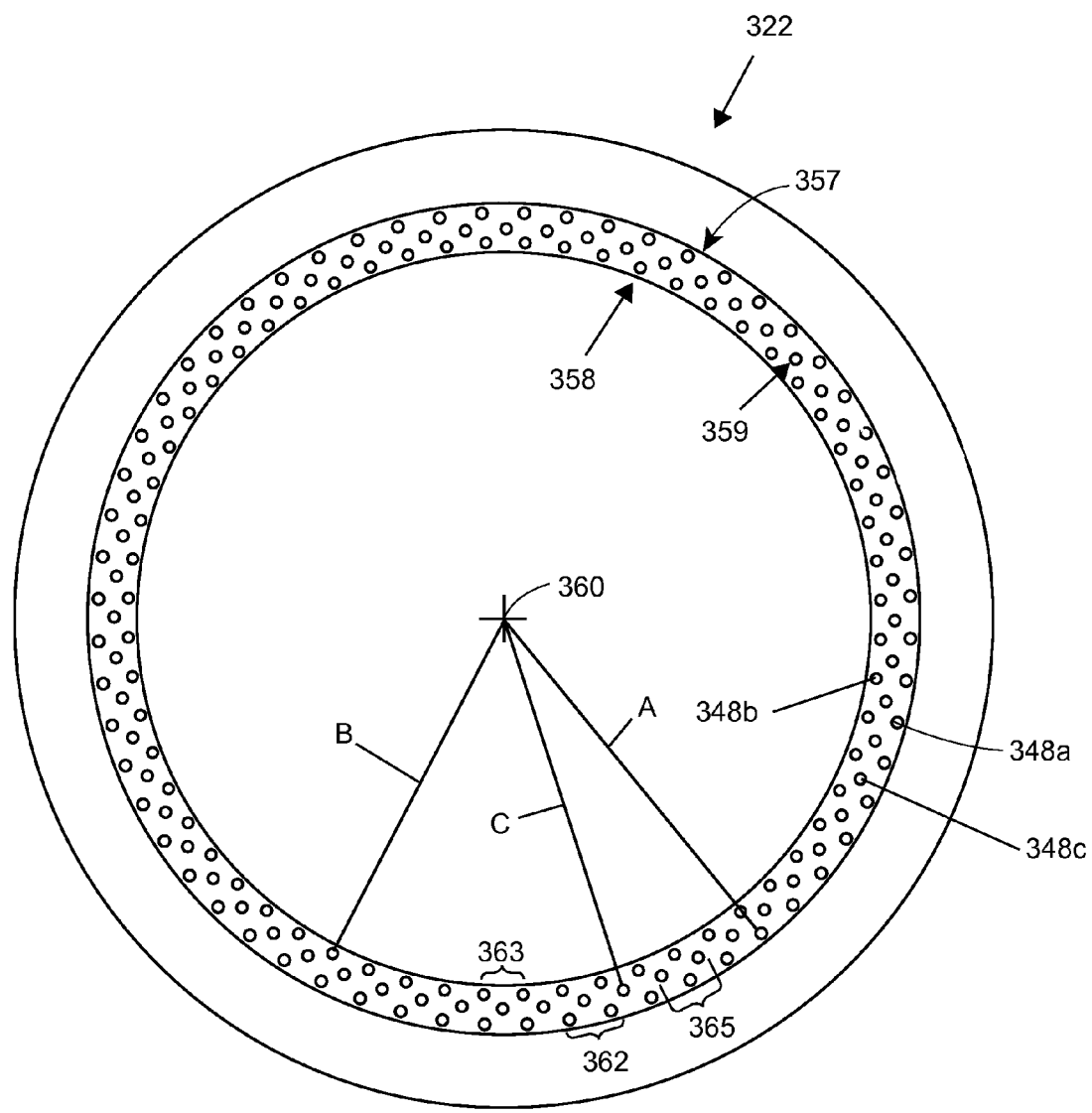
FIG. 8 is a lateral cross-sectional view of another alternate embodiment of a cage.

FIG. 8 illustrates another alternate embodiment of a cage 322 having first, second, and third pluralities of rods 348*a*, 348*b*, 348*c*. The first plurality of rods 348*s* is arranged so that the individual rods form a first circle 357 that is concentric with a longitudinal axis 360 of the cage 322. The first circle 357 formed by the first plurality of rods 348 has a radius A. Similarly, the second plurality of rods 348*b* is arranged so that the individual rods form a second circle 358 that is concentric with the longitudinal axis 360 of the cage 322. However, the second circle 358 has a radius B that is smaller than radius A of the first circle 357. The third plurality of rods 348*c* is arranged so that individual rods form a third circle 359 that is concentric with the longitudinal axis 360 of the cage 322. The third circle 359 has a radius C that is smaller than radius A of the first circle 357, but larger than radius B of the second circle 358.

Each of the rods in the first plurality of rods 348*a* is spaced from another rod in the first plurality of rods 348*a* by a first space 362. First space 362 is preferably between 1 and 5 times the diameter of an individual rod, more preferably between 1 and 3 times the diameter of an individual rod, and even more preferably between 1.5 and 2.5 times the diameter of an individual rod. While the rods 348 are illustrated as having a circular cross-sectional shape, other cross-sectional shapes, such as oval, triangular, square, rectangular, pentagonal, hexagonal, polygonal, or irregular cross-sectional shapes may be used to achieve particular characterization of fluid flow for a given situation. When a cross-sectional shape other than circular is employed, the above referenced diameters may correspond to a maximum thickness of the rod.

In a similar fashion, each of the rods in the second plurality of rods 348*b* is spaced from another rod in the second plurality of rods 348*b* by a second space 363 and each of the rods in the third plurality of rods 348*c* is spaced from another rod in the third plurality of rods by a third space 365. The second space 363 and/or the third space 365 is preferably between $1/32$ and 10 times the diameter of an individual rod, more preferably between $1/4$ and 3 times the diameter of an individual rod. In one embodiment the rods may have a radius of about $1/8$ in. In other embodiments, the rods may have a radius of between $1/1000$ and $1/10$ of the radius A of the first circle so that between 10 and 1000 rods may make up any one of the first, second, and third pluralities of rods 348*a*, 348*b*, 348C.

While a sliding stem valve is disclosed herein as an exemplary embodiment of a fluid control valve, the trim assemblies described herein may be used in virtually any type of fluid valve that includes a valve trim cage. For example, the disclosed seal assemblies may be used in various types of valves, e.g., ball valves, globe valves, butterfly valves, or eccentric plug valves.

Although certain control valve trim cages and fluid control valves have been described herein in accordance with the teachings of the present disclosure, the scope of the appended claims is not limited thereto. On the contrary, the claims cover all embodiments of the teachings of this disclosure that fairly fall within the scope of permissible equivalents.

The invention claimed is:

1. A control valve comprising:
   a valve body having a fluid inlet and a fluid outlet connected by a fluid passageway;
   a valve seat disposed within the fluid passageway;
   a cage disposed within the fluid passageway, the cage including a cage wall, a first plate connected to the cage wall and a second plate spaced apart from the cage wall, and a first plurality of rods longitudinally disposed between the first plate and the second plate;
   a flow control member movably disposed within the cage, the flow control member reciprocating within the cage and cooperating with the valve seat to control fluid flow through the fluid passageway; and
   a third plate disposed between the first plate and the second plate,
   wherein rods in the first plurality of rods are spaced laterally differently between the second plate and the third plate than between the first plate and the third plate; and
   wherein each rod in the plurality of rods has a circular cross-section.

2. The valve of claim 1, further comprising a second plurality of rods longitudinally disposed between the first plate and the second plate, each rod in the second plurality of rods having a circular cross-section.

3. The valve of claim 2, wherein the rods in the first plurality of rods are arranged to form a first circle when the cage is viewed in a lateral cross-section, the first circle having a first radius.

4. The control valve of claim 3, wherein the rods in the second plurality of rods are arranged to form a second circle when the cage is viewed in a lateral cross-section, the second circle having a second radius.

5. The control valve of claim 4, wherein the first radius is larger than the second radius.

6. The valve of claim 5, further comprising a third plurality of rods longitudinally disposed between the first plate and the second plate, each rod in the third plurality of rods having a circular cross-section,
wherein the rods in the third plurality of rods are arranged to form a third circle when the cage is viewed in a lateral cross-section, the third circle having a third radius, and
wherein the first and second radii are larger than the third radius.

7. The valve of claim 4, wherein the rods in the first plurality of rods are separated from one another about a circumference of the first circle by a distance of between $\frac{1}{32}$ and 10 times a diameter of an individual rod.

8. The valve of claim 7, wherein the rods in the second plurality of rods are arranged circumferentially around the second circle to be offset from the rods in the first plurality of rods.

9. The valve of claim 1, wherein the third plate is located between 10% and 30% of the distance from the second plate to the first plate.

10. The valve of claim 1, further comprising a fourth plate disposed between the first plate and the second plate.

11. A cage for a control valve trim assembly, the cage comprising:
a cage wall;
a first plate attached to the cage wall;
a second plate spaced apart from the cage wall;
a third plate disposed between the first plate and the second plate; and
a first plurality of rods longitudinally disposed between the first plate and the second plate,
wherein rods in the first plurality of rods are spaced laterally differently between the second plate and the third plate than between the first plate and the third plate; and
wherein each rod in the first plurality of rods has a circular cross-section.

12. The cage of claim 11, further comprising a second plurality of rods longitudinally disposed between the first plate and the second plate,
wherein each rod in the second plurality of rods has a circular cross-section.

13. The cage of claim 12, wherein the first plurality of rods are arranged to form a first circle having a first radius when the cage is viewed in lateral cross-section.

14. The cage of claim 13, wherein the second plurality of rods are arranged to form a second circle having a second radius when the cage is viewed in lateral cross-section.

15. The cage of claim 14, wherein the first radius is larger than the second radius.

16. The cage of claim 15, wherein the rods of the second plurality of rods are circumferentially offset from the rods of the first plurality of rods.

17. The cage of claim 11, wherein the third plate is located between 10% and 30% of the distance between the second plate and the first plate.

* * * * *

UNITED STATES PATENT AND TRADEMARK OFFICE
CERTIFICATE OF CORRECTION

| | | |
|---|---|---|
| PATENT NO. | : 9,518,662 B2 | Page 1 of 1 |
| APPLICATION NO. | : 13/895789 | |
| DATED | : December 13, 2016 | |
| INVENTOR(S) | : Aaron C. Doran | |

It is certified that error appears in the above-identified patent and that said Letters Patent is hereby corrected as shown below:

In the Specification

At Column 4, Line 46, "plurality or" should be -- plurality of --.

At Column 4, Line 30, "first plurality of rods 248" should be -- single plurality of rods 248 --.

At Column 5, Line 25, "348C" should be -- 348c --.

At Column 5, Line 49, "348s" should be -- 348a --.

Signed and Sealed this
Third Day of October, 2017

Joseph Matal
*Performing the Functions and Duties of the*
*Under Secretary of Commerce for Intellectual Property and*
*Director of the United States Patent and Trademark Office*